United States Patent
Anschutz et al.

(10) Patent No.: US 8,675,469 B2
(45) Date of Patent: Mar. 18, 2014

(54) MONITORING NON-MANAGED WIRE PAIRS TO IMPROVE DYNAMIC SPECTRUM MANAGEMENT PERFORMANCE

(75) Inventors: Thomas Anschutz, Conyers, GA (US); Thomas Starr, Barrington, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 552 days.

(21) Appl. No.: 12/640,662

(22) Filed: Dec. 17, 2009

(65) Prior Publication Data

US 2011/0150057 A1  Jun. 23, 2011

(51) Int. Cl.
*H04J 1/12* (2006.01)

(52) U.S. Cl.
USPC .......................................... 370/201; 375/222

(58) Field of Classification Search
USPC ............... 370/201, 252, 241, 286; 375/222; 455/295
See application file for complete search history.

(56) References Cited

U.S. PATENT DOCUMENTS

| | | | |
|---|---|---|---|
| 4,535,472 A * | 8/1985 | Tomcik | 704/229 |
| 4,956,871 A * | 9/1990 | Swaminathan | 704/229 |
| 6,144,696 A * | 11/2000 | Shively et al. | 375/222 |
| 6,470,059 B2 | 10/2002 | Starr | |
| 6,990,196 B2 | 1/2006 | Zeng et al. | |
| 6,999,583 B2 | 2/2006 | Valenti et al. | |
| 7,142,501 B1 * | 11/2006 | Barrass et al. | 370/201 |
| 7,315,538 B2 | 1/2008 | Wright et al. | |
| 7,512,683 B2 | 3/2009 | Anschutz et al. | |
| 7,536,460 B2 | 5/2009 | Anschutz et al. | |
| 7,545,788 B2 | 6/2009 | Anschutz et al. | |
| 7,573,906 B2 | 8/2009 | Adamczyk et al. | |
| 7,573,943 B2 | 8/2009 | Cioffi | |
| 7,639,596 B2 * | 12/2009 | Cioffi | 370/201 |
| 7,817,745 B2 * | 10/2010 | Cioffi et al. | 375/296 |
| 7,924,736 B2 * | 4/2011 | Cioffi et al. | 370/252 |
| 8,018,868 B2 * | 9/2011 | Nuzman et al. | 370/252 |
| 8,233,376 B2 * | 7/2012 | Ilani | 370/201 |
| 2006/0039454 A1 * | 2/2006 | Cioffi | 375/222 |
| 2008/0219182 A1 | 9/2008 | Savoor et al. | |
| 2008/0267055 A1 * | 10/2008 | Starr | 370/201 |
| 2008/0291989 A1 * | 11/2008 | Ashikhmin et al. | 375/224 |

OTHER PUBLICATIONS

"Dynamic Spectrum Management—A methodology for providing significantly higher broadband to the users," Cioffi, Telektronikk Apr. 2004, pp. 126-137.

(Continued)

*Primary Examiner* — Hassan Kizou
*Assistant Examiner* — Amy Ling
(74) *Attorney, Agent, or Firm* — Guntin & Gust, PLC; Douglas Schnabel (57) ABSTRACT

A digital subscriber line (DSL) network provides enhanced dynamic spectrum management (DSM) based on estimated foreign interference obtained from monitoring unmanaged wire pairs in a cable. A DSL access multiplexer (DSLAM) or other line terminal provides vectored DSL signaling to a plurality of subscribers via a first set of wire pairs of the cable. The DSLAM monitors a second set of one or more wire pairs of the cable that are not connected to the vectored group associated with the first set of wire pairs to estimate foreign interference introduced to the first set of wire pairs. The DSLAM then modifies the vectored DSL transmitted signaling responsive to the estimated foreign interference so as to pre-cancel or otherwise compensate for the foreign interference introduced into the managed wire pairs.

20 Claims, 4 Drawing Sheets

(56) References Cited

OTHER PUBLICATIONS

"Dynamic Spectrum Management (DSM), Level 3—Vectoring for Multi-100 Mbps DSLs," Cloth, Birds of a Feather Session, DSL Forum, ASSIA, Inc. and Stanford University, Aug. 28, 2007, pp. 1-14.

"Dynamic Spectrum Management (DSM), Level 3—Vectoring for Multi-100 Mbps DSLs," Cioffi, Birds of a Feather Session, DSL Forum, ASSIA, Inc. and Stanford University, Aug. 28, 2007, pp. 1-17.

"DSM Implementation and Benefits," Posthuma, DSL Forum, Birds of a Feather on DSM, Alcatel-Lucent, Aug. 28, 2007, pp. 1-16.

"DSM Consortium—Presentation to DSL Forum," Schliserman, iSMART, DSL Forum, Birds of a Feather on DSM, AVP Networking Technologies, CTO Group, BBA, ECI Telecom, Ltd, Aug. 28, 2007, pp. 1-10.

"Partial Crosstalk Cancellation for Upstream VDSL," Cendrillon, Department of Electrical Engineering, Katholieke Universiteit Leuven, Belgium, Mar. 5, 2003, pp. 1520-1535.

"Simplified Waterfilling for Power Allocation in MIMO-DSL," Cendrillon, Katholieke Universiteit Leuven, Belgium, Nov. 11, 1992, pp. 1-16.

"Vectoring in VDSL2: Teh Enabler for High Speed Triple Play Service," Sorbara, DSL Forum, Birds of a Feather on DSM, Conexant, Aug. 28, 2007, pp. 1-13.

Cioffi, "Vectored DSLs with DSM: The road to Ubiquitous Gigabit DSLs", Stanford University, France Telecom, ASSIA, Inc., pp. 1-11. World Telecommunications Conference., May 2, 2006.

Verlinden, "Dynamic Spectrum Management for Digital Subscriber Lines—Edition 2", White Paper, Alcatel, pp. 1-12, Feb. 16, 2007.

Wilson, "DSM Modeling in the Telco Plant", ADTRAN, Inc., 18 pgs, Aug. 27, 2007.

Yu, "Trellis Precoding for the Broadcast Channel", Electrical Engineering Department, Stanford University, pp. 1-5. IEEE Globecom., Nov. 25, 2001.

* cited by examiner

MONITORING NON-MANAGED WIRE PAIRS TO IMPROVE DYNAMIC SPECTRUM MANAGEMENT PERFORMANCE

FIELD OF THE DISCLOSURE

The present disclosure generally relates to digital subscriber line (DSL) service, and more particularly relates to dynamic spectrum management (DSM) for DSL service.

BACKGROUND

Digital subscriber line (DSL) service provides high-speed data transmission by conducting signaling through wire pairs. Copper loops and other "twisted pairs" often are suitable physical media for DSL service, thus permitting the provision of DSL service via existing copper telephone lines. These copper telephone lines typically are grouped by the dozens or hundreds into binder groups and sets of one or more of binder groups are then grouped together in cables, which subjects the DSL signaling conducted via the wire pairs to interference from signaling in other wire pairs in the cable. The wire pairs in the cable also are subject to interference from sources external to the cable, such as radio station transmitters and florescent light ballasts.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

FIGS. 1-4 illustrate example techniques for improved DSM in DSL networks. In one embodiment, a DSL access multiplexer (DSLAM) or other line terminal provides vectored DSL signaling via a subset of the wire pairs of a cable, whereby the wire pairs of the subset are coordinated by the DSLAM for purposes of the vectored DSL signaling. The cable also may include other wire pairs used to conduct signaling unmanaged by the DSLAM, such as other DSL signaling by other DSLAMs. This unrelated signaling can introduce crosstalk interference into the subset of wire pairs carrying the vectored DSL signaling due to capacitive and inductive coupling arising from the physical proximity of the wire pairs of the cable. Further, there may be external disturbers, such as radio station transmissions and florescent light ballasts, that introduce common mode noise into the subset of wire pairs carrying the vectored DSL signaling. The term "foreign interference" is used herein to refer to the interference potentially introduced into a wire pair from sources other than other DSL lines that are in the same vectored group as the victim line. The term "vectored group" is a set of lines that are commonly managed or coordinated by a DSLAM in order to perform vectored signal processing. The source of foreign interference may be external to the telephone cable, crosstalk from a line in a different binder group within the cable, or a line within the same binder group as the victim line. To obtain an estimate of this foreign interference, the DSLAM also monitors some or all of the other wire pairs in the cable, including those wire pairs used by other DSLAMs to provide separate signaling and including those wire pairs that are inactive or otherwise not in use for DSL signaling. The DSLAM then may modify the vectored DSL signaling to subtract out or otherwise compensate for the estimated foreign interference. The modification to the vectored DSL signaling can include modifying the precoding symbols to be transmitted (that is, adjusting the phase/amplitude of the symbols); avoiding use of frequency sub-bands identified as being particularly subject to interference; or limiting the use of such affected frequency sub-bands by, for example, adjusting bit allocations among frequency sub-bands or adjusting power allocation among frequency sub-bands, adjusting a power spectral density mask, and the like. In at least one embodiment, the process of estimating foreign interference by monitoring some or all of the unmanaged/inactive wire pairs of a cable and then adjusting the vectored DSL signaling accordingly is performed on a continual or periodic basis.

Figure 1:
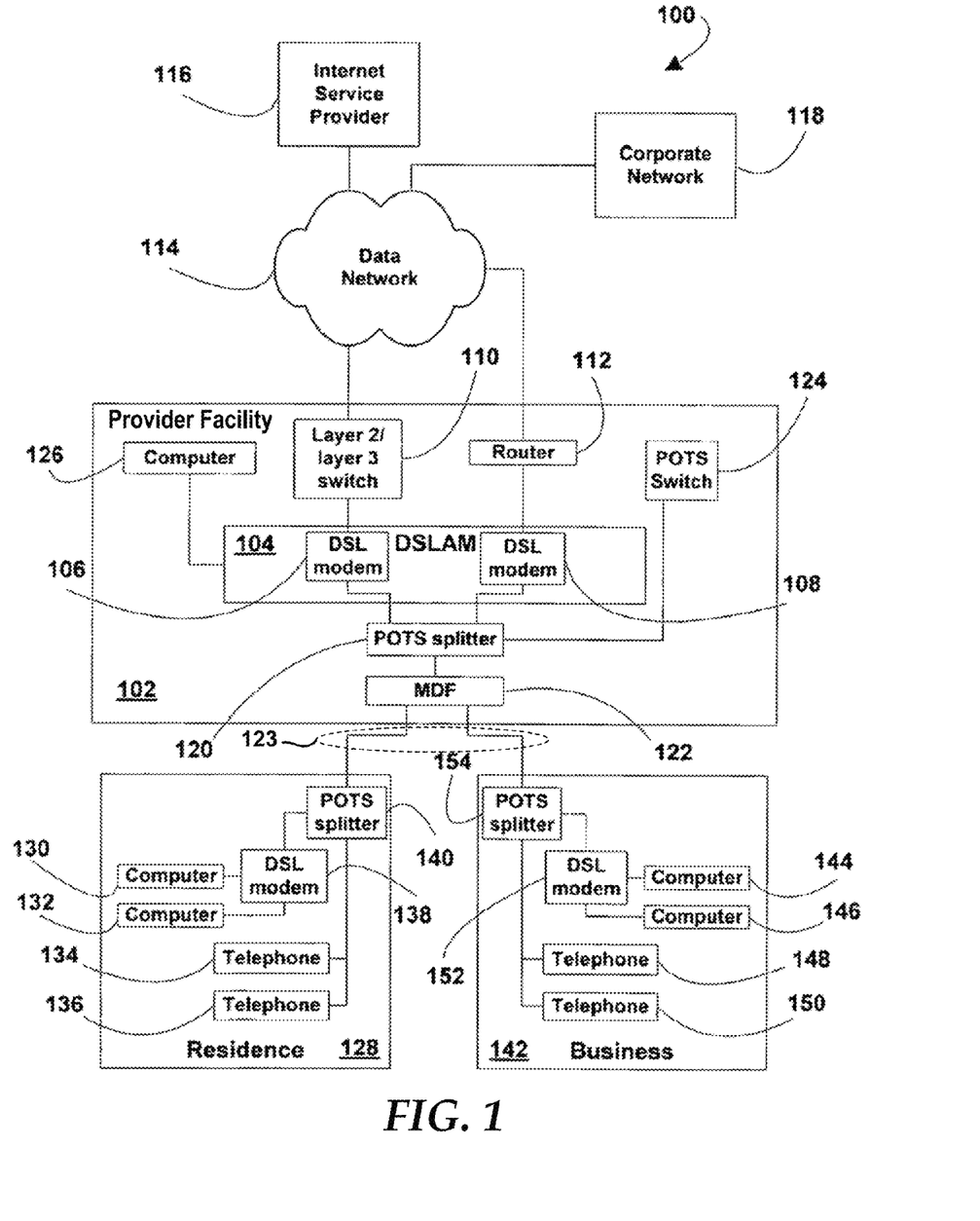
FIG. 1 is a block diagram illustrating an example DSL network implementing enhanced DSM in accordance with at least one embodiment of the present disclosure.

FIG. 1 illustrates an exemplary embodiment of a DSL network 100 providing enhanced DSM for vectored DSL signaling through the monitoring of unmanaged wire pairs of a cable. The DSL network 100 can be a very high data rate DSL (VDSL) network, an ADSL network, an ADSL2 network, an ADSL2plus network, or any of a variety of other advanced DSL networks. The DSL network 100 includes a provider facility 102 in which a DSL access multiplexer (DSLAM) 104 can be located. The provider facility 102 can be a central office (CO), a remote terminal (RT), a serving area interface (SAI), or the like. Central DSL modems 106 and 108 are located in the provider facility 102. In the case in which the DSL network is an ADSL network, each DSL modem in the provider facility 102 can be an ADSL terminating unit-central office (ATU-C). In a particular embodiment, the DSL modem 106 and the DSL modem 108 are installed in the DSLAM 104.

In an illustrative embodiment, a layer 2/layer 3 switch 110 is connected to the DSL modem 106 and a router 112 is connected to the DSL modem 108. In a particular embodiment, the layer 2/layer 3 switch 110 is an asynchronous transfer mode (ATM) switch or an Ethernet switch. As shown, the layer 2/layer 3 switch 110 and the router 112 are connected to a data network 114, such as the Internet. As such, in a particular embodiment, the layer 2/layer 3 switch 110 and the router 112 provide data network connectivity to the DSL modem 106 and the DSL modem 108. In an illustrative embodiment, an Internet service provider (ISP) 116 is connected to the data network 114. Moreover, a private network 118 is connected to the data network 114. For simplicity, only one ISP 116 and only one private network 118 is shown connected to the data network 114, but any number of ISPs and any number of private networks 118 can be connected to the data network 114.

FIG. 1 further shows that the provider facility 102 includes a plain old telephone service (POTS) splitter 120 that can be connected to the DSL modem 106 and the DSL modem 108. Also, a main distribution frame (MDF) 122 is connected to the POTS splitter 120. A POTS switch 124 can be connected to the POTS splitter 120 in order to switch incoming telephone calls received at the provider facility 102. Alternatively, the DSL lines may convey only digital transmission, without POTS on the same line, or may carry only POTS, without DSL digital transmissions on the same line. All these types of arrangement typically coexist on the wire pairs of one or more cables 123 connecting the MDF 122 and business and residence premises 142 and 128. Additionally, the provider facility 102 includes a managing computer 126 that can be connected to the DSLAM 104. In a particular embodiment, the managing computer 126 can be used to manage the DSL network 100 and to enhance or optimize the performance of the DSL network 100.

As depicted, the DSL network 100 can connect to a residence 128 of a subscriber, in which user devices 130 and 132 are located. FIG. 1 also shows telephones 134 and 136 that are located in the residence 128. As shown in FIG. 1, the user devices 130 and 132 are connected to a remote DSL modem 138. In the case that the DSL network 100 is an ADSL network the remote DSL modem 138 can be an ADSL terminating unit-remote (ATU-R). The remote DSL modem 138 is connected to a remote POTS splitter 140 that, in turn, is connected to the MDF 122. Accordingly, either the central DSL modem 106 or the central DSL modem 108 can communicate with the remote DSL modem 138 via the POTS splitter 120, the MDF 122, and the remote POTS splitter 140 in order to provide network connectivity to the user devices 130 and 132. The telephones 134 and 136 also are connected to the remote POTS splitter 140. Telephone calls made by the telephones 134, 136 can be routed to the POTS switch 124 at the provider facility 102 via the remote POTS splitter 140, the MDF 122, and the POTS splitter 120. In the exemplary, non-limiting embodiment of the DSL network 100 shown in FIG. 1, two user devices 130 and 132 and two telephones 134 and 136 are illustrated, but any number of user devices and telephones can be located in the residence 128 and connected to the provider facility 102.

The DSL network 100 further can include a business 142 in which a user devices 144 and 146 are located. A first telephone 148 and a second telephone 150 can also be located in the customer business 142. As shown in FIG. 1, the user devices 144 and 146 are connected to remote DSL modem 152. In a particular embodiment, the remote DSL modem 152 is connected to a remote POTS splitter 154 that, in turn, is connected to the MDF 122. Accordingly, either the central DSL modem 106 or the central DSL modem 108 can communicate with the remote DSL modem 152 via the POTS splitter 120 within the provider facility 102, the MDF 122, and the remote POTS splitter 154 in order to provide network connectivity to the user devices 144 and 46. The business telephones 148 and 150 also are connected to the remote POTS splitter 154. Telephone calls made by the telephones 148 and 150 can be routed to the POTS switch 124 located at the provider facility 102 via the remote POTS splitter 154, the MDF 122, and the CO POTS splitter 120. In an illustrative embodiment, two user devices 144 and 146 and two business telephones 148, 150 are illustrated, but any number of user devices and business telephones can be located in the business 142 and connected to the provider facility 102.

In nearly all DSL implementations, including the illustrated example DSL network 100, twisted-pair telephone loops or coaxial cables are bundled together in one or more binder groups and sets of one or more binder groups are grouped together into cables, which are then used as at least a part of the transmission medium that connects the central office or remote terminal to subscribers' equipment. To illustrate, in the system of FIG. 1, the wire pairs connecting the provider facility 102 to the customer residence 128 and the business 142 may be implemented together into a cable 123, which also may carry wire pairs for other facilities that are not illustrated in FIG. 1. The twisting of the twisted-pair or the shielding of the coaxial cables provides some protection against external interference, as well as protection from crosstalk interference from signaling conducted via other wire pairs in the cable. However, crosstalk interference and common mode interference becomes a significant contributor to noise within the transmission system, particularly as distance and frequency increases. This can become particularly problematic in very high speed DSL (VDSL) systems. In order to overcome foreign interference introduced by disturbers both internal and external to the cable, the dynamic spectrum management implemented in the DSL network 100 can be enhanced. As described in greater detail below, this enhancement can include an improved DSM process implemented by a DSLAM or other line terminal that estimates foreign interference through monitoring of unmanaged wire pairs in the cable and then adjusting a vectoring or coordination process applied to the DSL service based on the estimated foreign interference so as to compensate for the foreign interference.

Figure 2:
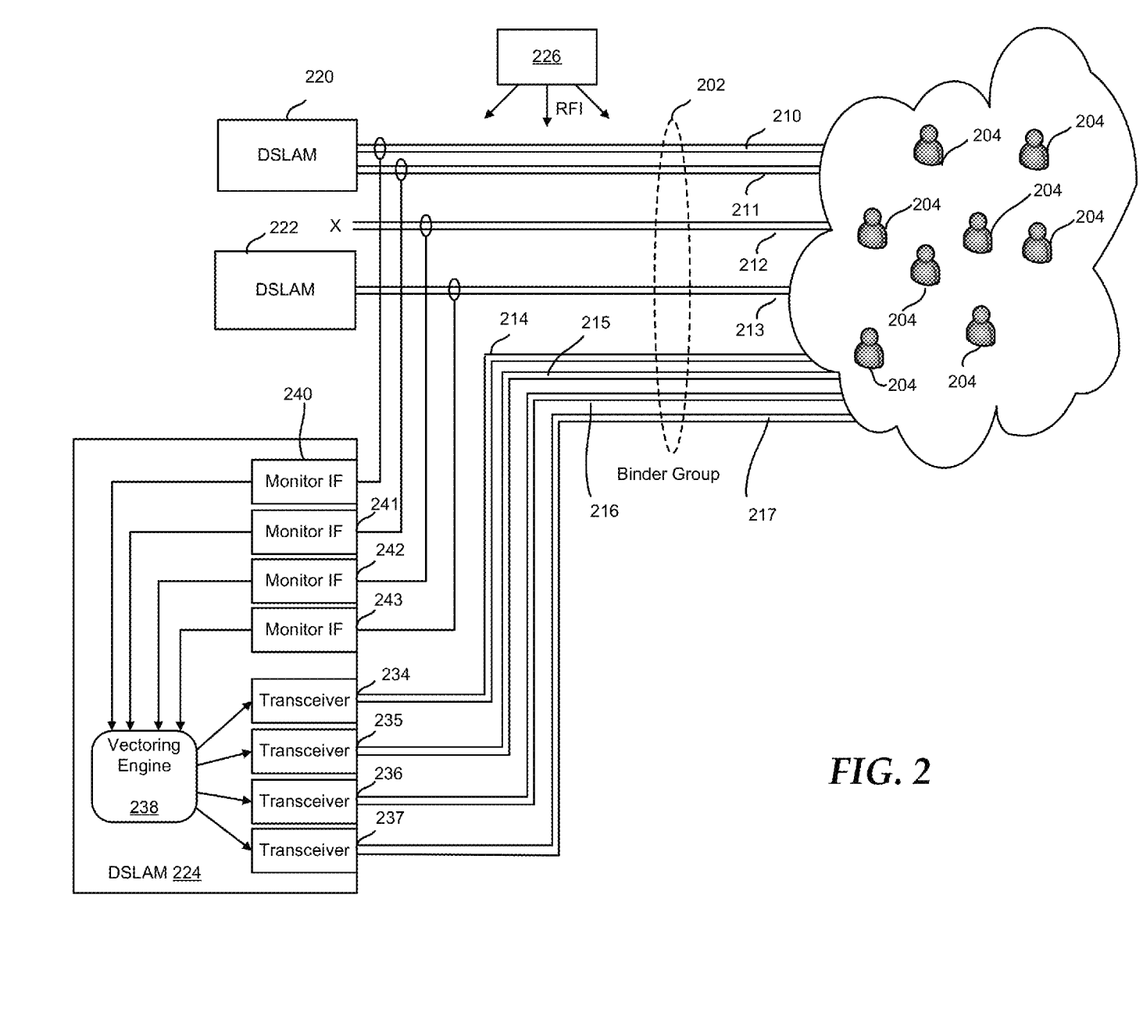
FIG. 2 is a block diagram illustrating a more detailed example of a segment of a DSL network implementing enhanced DSM in accordance with at least one embodiment of the present disclosure.

FIG. 2 illustrates a more detailed example of a segment of a DSL network implementing enhanced DSM based on estimated foreign interference in accordance with at least one embodiment of the present disclosure. The DSL network segment includes a cable 202 comprising a plurality of wire pairs, such as wire pairs 210, 211, 212, 213, 214, 215, 216, and 217, used to conduct DSL signaling or other signaling with a plurality of subscribers 204 via one or more DSLAMs 220, 222, and 224. The particular number of wire pairs of the cable 202 and the particular number and arrangement of DSLAMs is non-limiting and illustrative only.

In the depicted example, the wire pairs 210 and 211 are used by a DSLAM 220 to provide DSL signaling associated with a DSL service provided to a subset of the subscribers 204, the wire pair 213 is used by a DSLAM 222 to provide DSL signaling associated with a separate DSL service provided to another subset of the subscribers 204, and the wire pairs 214-217 are used to provide yet another DSL service through vectored DSL signaling to yet another subset of the subscribers 204. Further, the wire pair 214 is inactive; that is, unused for conducting DSL signaling.

In the example of FIG. 2, the DSL signaling provided by the DSLAM 220 and the DSLAM 222 is not managed or otherwise controlled by the DSLAM 224, and vice versa. To illustrate, the DSLAM 224 could be operated by one service provider and the DSLAMs 220 and 222 could be operated by separate service providers. Alternately, the DSLAM 224 could be a DSLAM located in one cabinet of a CO or RT of a service provider and the DSLAM 220 could be collocated at the same CO or RT but in a different cabinet. As another example, the DSLAM 224 could be implemented as one line card of a line terminal and the DSLAMS 220 and 222 could be implemented other line cards of the same line terminal. Thus, the DSLAM 224 manages the wire pairs 214-217 as a vectored group and accordingly can coordinate the DSL signaling conducted among these wire pairs based on knowledge regarding the status of each of these wire pairs so as to improve the overall throughput of the vectored DSL signaling over all of the wire pairs. However, because the wire pairs 210, 211, 212, and 213 are not managed by the DSLAM 224, the DSLAM 224 cannot alter or otherwise modify the signaling conducted by these wire pairs so as to reduce any resulting interference in the managed wire pairs 214, 215, 216, and 217. Further, external disturbers 226, such as AM radio transmission towers or florescent light ballasts, introduce periodic or aperiodic RFI into the managed wire pairs. Accordingly, as described below, the DSLAM 224 monitors some or all of the wire pairs unmanaged by the DSLAM 224 (that is, the wire pairs 210, 211, 212, and 213) to estimate the crosstalk interference introduced by the unmanaged wire pairs into the wire pairs 214, 215, 216, and 217 and to estimate the common mode interference introduced by the external disturbers 226. The DSLAM 224 then modifies the vectoring of the DSL signaling provided via these managed wire pairs based on the estimated foreign interference using any of a variety of conventional DSM interference adaptation techniques, such as coordinated precoding, bit allocation, modification of power spectral density masks, and the like.

As depicted in FIG. 2, the DSLAM 224 includes a plurality of transceivers 234, 235, 236, and 237 for transmitting and receiving DSL signaling via the wire pairs 214, 215, 216, and 217, respectively. In at least one embodiment, the DSLAM 224 includes a vectoring engine 238 that implements a DSM process to manage the vectoring of the transmissions of the transceivers 234, 235, 236, and 237 so as to optimize the overall transmission rate and reliability of the DSL signaling collectively provided via the wireless pairs 214, 215, 216, and 217. In order to more fully enhance the DSM process over conventional approaches, the vectoring engine 238 further estimates the foreign interference due to crosstalk interference and common mode interference via plurality of monitoring interfaces 240, 241, 242, and 243, each monitoring interface coupled to a corresponding wire pair of the cable that is not used for conducting the vectored DSL signaling by the DSLAM 224; that is, the monitoring interfaces are coupled to those wire pairs of the cable that are unmanaged by the DSLAM 224. In the illustrated example, the monitoring interfaces 240, 241, 242, and 243 are connected to the unmanaged wire pairs 210, 211, 212, and 213, respectively. In at least one embodiment, the monitoring interfaces are connected to their respective wire pairs via high-impedance interface circuits so as avoid interfering with any signaling conducted via the unmanaged wire pairs.

Figure 3:
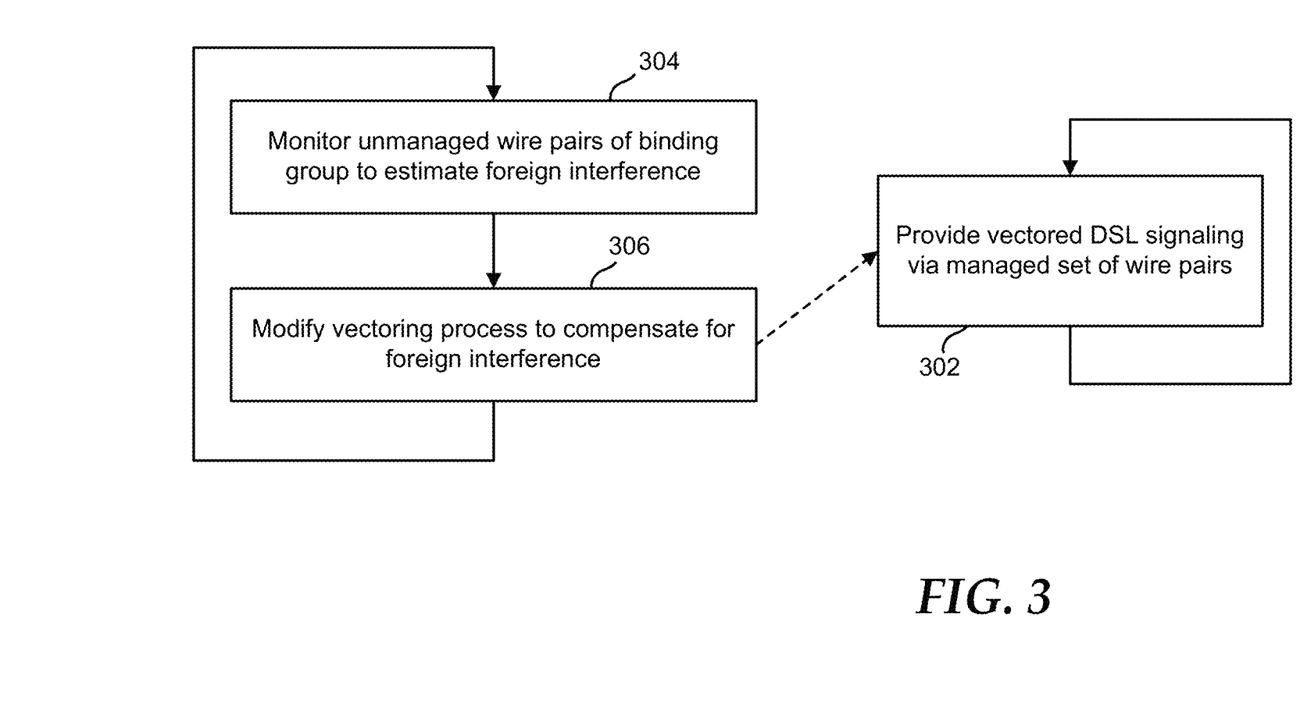
FIG. 3 is a flow diagram illustrating an exemplary method for enhanced DSM in accordance with at least one embodiment of the present disclosure.

FIG. 3 illustrates a method of operation of the DSLAM 224 for providing DSL signaling with enhanced vectorization based on estimated foreign interference in accordance with at least one embodiment of the present disclosure. The process illustrated in FIG. 3 can be continuously repeated or repeated on a periodic basis so as to adapt to changing noise environments.

At block 302, the DSLAM 224 receives data to be transmitted in accordance with DSL services provided to a plurality of subscribers via the wire pairs 214, 215, 216, and 217. This data is processed for transmission as series of discrete multitone (DMT) symbols via the transceivers 234-237 and the managed set of wire pairs. As part of the processing, the vectoring engine 238 obtains estimations of the foreign interference caused by signaling in the unmanaged wire pairs, as well as local interference that would be caused by signaling within the set of managed wire pairs, and coordinates the DSL signals transmitted via the managed wire pairs 214, 215, 216, and 217 so as to pre-cancel or otherwise compensate for this estimated interference. Any of a variety of techniques may be implemented coordinate the DSL signals to as to compensate for crosstalk and other interference. In one embodiment, the vectoring engine 228 can precode the symbols (that is, adjust the phase and/or amplitude of the symbols) transmitted through the vectored DSL signaling to compensate for the estimated interference. In addition to precoding symbols, the vectoring engine 228 can identify those frequency sub-bands affected by noise and then either avoid use of one or more of the affected frequency sub-bands for use in the vectored DSL signaling, or by adjusting a bit allocation or power allocation among the frequency sub-bands so as to deemphasize use of the affected frequency sub-bands.

In parallel with the transceivers 234-237 transmitting the vectored DSL signaling via the managed set of wire pairs, at block 304 the vectoring engine 238 continuously monitors the unmanaged wire pairs 210, 211, 212, and 213 to estimate the crosstalk interference introduced by signaling (unmanaged by the DSLAM 224) conducted via these wire pairs, as well as to estimate the common mode interference introduced by disturbers. In one embodiment, this monitoring process includes generating a transform matrix of interference coefficients, each interference coefficient representing an estimated amount of crosstalk interference introduced by one wire pair of the binding group 202 into another wire pair of the binding group 202. Any of a variety of conventional techniques may be implemented to generate this transform matrix, examples of which can be found in U.S. Pat. No. 6,990,196 to Zeng et. al., U.S. Pat. No. 6,999,583 to Valenti et al., and U.S. Pat. App. Pub. No. 2008/0291989 to Ashkhim et al., the entireties of which are incorporated by reference herein. Further, unused wire pairs, such as wire pair 212, act as antenna particularly well suited for detecting common mode interference and thus the vectoring engine 238 may monitor any unused wire pairs to identify common mode interference accordingly.

At block 306, the vectoring engine 238 uses the foreign interference estimated from the monitoring of the unmanaged wire pairs 210, 211, 212, and 213 to determine any modifications to make to the vectoring process so as to subtract the estimated interference from the vectored DSL signaling. As noted above, a transform matrix of interference coefficients may be generated so as to identify the degree of interference introduced between any two wire pairs of the cable 202. Typically, a relatively small number of wire pairs serve as the majority of disturbers within the cable. Accordingly, the vectoring engine 238 may filter the transform matrix so as to identify only a certain number of the most significant disturbers and then consider only these most significant disturbers when modifying the vectoring parameters employed in the vectored DSL signaling process of block 302. As noted above, the vectoring process can include precoding symbols so as to subtract interfering signals from the managed wire pairs, avoiding or limiting use of frequency sub-bands affected by noise through bit allocation or power allocation, and the like. Accordingly, the modification to the vectoring process performed at block 306 can include, for example, adjustments to the precoding process, adjustments to the bit allocation scheme or the power spectral density mask, and the like.

Figure 4:
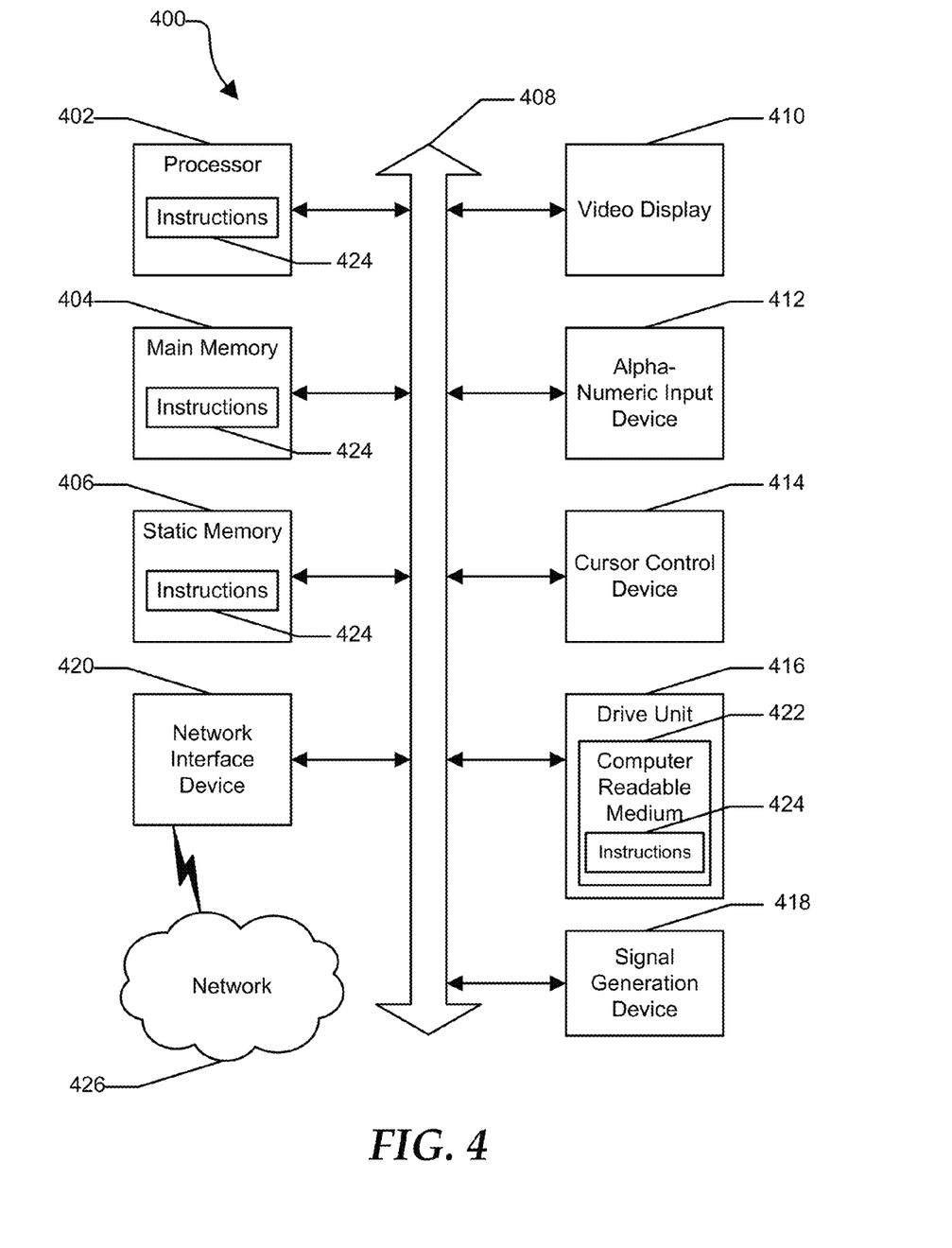
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid state display, or a cathode ray tube (CRT). Additionally, the computer system 400 may include an input device 412 such as a keyboard, and a cursor control device 414 such as a mouse. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
providing, by a system comprising a processor, vectored digital subscriber line signaling from a first line terminal to equipment of a plurality of subscribers via a first set of wire pairs of a cable;
monitoring, by the system, a second set of wire pairs of the cable that is not used for the vectored digital subscriber line signaling and that is not managed by the system, to estimate foreign interference introduced to the first set of wire pairs; and
modifying the vectored digital subscriber line signaling responsive to the foreign interference by precoding symbols to be transmitted according to an adjustment of phase and amplitude of the symbols, by identifying frequency sub-bands in the vectored digital subscriber line signaling affected by the foreign interference, and by avoiding use of the frequency sub-bands or by adjusting a bit allocation or power allocation of the frequency sub-bands to deemphasize use of the frequency sub-bands.

2. The method of claim 1, wherein modifying the precoding symbols is based on the foreign interference.

3. The method of claim 1, wherein monitoring the second set of wire pairs comprises generating a transform matrix comprising interference coefficients for respective pairings of a first wire pair from the second set and a second wire pair from the first set, and wherein modifying the precoding symbols is based on the transform matrix.

4. The method of claim 1, wherein the foreign interference comprises crosstalk interference from digital subscriber line signaling conducted via the wire pairs of the second set.

5. The method of claim 1, wherein at least a first subset of the wire pairs of the second set is used to provide digital subscriber line signaling from at least a second line terminal.

6. The method of claim 5, wherein the first line terminal and the second line terminal are operated by a common service provider.

7. The method of claim 6, wherein the first line terminal and the second line terminal are collocated at a common provider facility of the commmon service provider.

8. The method of claim 5, wherein the first line terminal and the second line terminal are operated by different service providers.

9. The method of claim 5, wherein a second subset of the wire pairs of the second set is not in use for digital subscriber line signaling, wherein monitoring the second set of wire pairs comprises monitoring the second subset to estimate common mode interference, and wherein modifying the vectored digital subscriber line signaling further comprises modifying the vectored digital subscriber line signaling based on the common mode interference.

10. The method of claim 1, wherein monitoring the second set of the wire pairs comprises monitoring the second set of the wire pairs via a high-impedance interface of the first line terminal.

11. A line terminal comprising:
a set of transceivers, each transceiver coupled to a respective wire pair of a first set of wire pairs of a cable, wherein the line terminal provides vectored digital subscriber line signaling to equipment of a plurality of subscribers over the first set of wire pairs via the set of transceivers;
a set of monitoring interfaces, each monitoring interface coupled to a respective wire pair of a second set of wire pairs of the cable, wherein the second set of the wire pairs is not used for the vectored subscriber line signaling;
a memory to store instructions; and
a processor coupled to the memory, the set of transceivers, and the set of monitoring interfaces, wherein responsive to executing the instructions, the processor performs operations comprising:
monitoring the second set of the wire pairs to estimate foreign interference introduced to the first set of wire pairs, wherein the second set of the wire pairs is not managed by the processor; and
modifying the vectored digital subscriber line signaling responsive to the foreign interference by precoding symbols to be transmitted according to an adjustment of phase and amplitude of the symbols.

12. The line terminal of claim 11, wherein modifying the precoding symbols is based on the foreign interference.

13. The line terminal of claim 12, wherein monitoring the second set of the wire pairs comprises generating a transform matrix comprising interference coefficients for respective pairings of a first wire pair from the second set and a second wire pair from the first set, and wherein modifying the precoding symbols is based on the transform matrix.

14. The line terminal of claim 11, wherein the foreign interference comprises crosstalk interference from digital subscriber line signaling conducted via the wire pairs of the second set.

15. The line terminal of claim 11, wherein the monitoring interfaces comprise high-impedance monitoring interfaces.

16. A communications network, comprising:
a first line terminal comprising:
a set of transceivers, each transceiver coupled to a respective wire pair of a first set of wire pairs of a cable, wherein the line terminal provides vectored digital subscriber line signaling to equipment of a plurality of subscribers over the first set of wire pairs via the set of transceivers;
a set of monitoring interfaces, each monitoring interface coupled to a respective wire pair of a second set of the wire pairs of the cable, wherein the second set of the wire pairs is not used for the vectored subscriber line signaling;
a memory to store instructions; and
a processor coupled to the memory, the set of transceivers, and the set of monitoring interfaces, wherein responsive to executing the instructions, the processor performs operations comprising:
monitoring the second set of the wire pairs to estimate foreign interference introduced to the first set of wire pairs, wherein the second set of the wire pairs is not managed by the processor; and
modifying the vectored digital subscriber line signaling responsive to the foreign interference by precoding symbols to be transmitted according to an adjustment of phase and amplitude of the symbols; and
a second line terminal to provide digital subscriber line signaling to a plurality of subscribers via at least a first subset of the wire pairs of the second set.

17. The communications network of claim 16, wherein the first line terminal and the second line terminal are operated by a common service provider.

18. The communications network of claim 17, wherein the first line terminal and the second line terminal are collocated at a common provider facility of the common service provider.

19. The communications network of claim 16, wherein the first line terminal and the second line terminal are operated by different service providers.

20. The communications network of claim 16, wherein a second subset of the wire pairs of the second set is not in use for digital subscriber line signaling, and wherein monitoring the second set of the wire pairs comprises monitoring the second subset to estimate common mode interference and to modify the vectored digital subscriber line signaling based on the common mode interference.

* * * * *